*(12)* United States Patent
Lin et al.

(10) Patent No.: US 10,833,510 B2
(45) Date of Patent: Nov. 10, 2020

(54) ELECTROMAGNETIC WAVE CHARGE MANAGEMENT CIRCUIT AND ELECTROMAGNETIC WAVE CHARGE MANAGEMENT METHOD

(71) Applicant: GOLD CARBON CO.,LTD., Taoyuan (TW)

(72) Inventors: Yeou-Fu Lin, Taipei (TW); Jung-Tzung Wei, Taoyuan (TW)

(73) Assignee: GOLD CARBON CO., LTD, Taoyuan (TW)

( * ) Notice: Subject to any disclaimer, the term of this patent is extended or adjusted under 35 U.S.C. 154(b) by 60 days.

(21) Appl. No.: 16/207,948

(22) Filed: Dec. 3, 2018

(65) Prior Publication Data

US 2019/0386506 A1    Dec. 19, 2019

Related U.S. Application Data

(60) Provisional application No. 62/684,621, filed on Jun. 13, 2018.

(51) Int. Cl.
*H02J 7/00* (2006.01)
*H02J 50/20* (2016.01)
*H01M 10/44* (2006.01)

(52) U.S. Cl.
CPC ............ *H02J 7/00* (2013.01); *H01M 10/44* (2013.01); *H02J 50/20* (2016.02)

(58) Field of Classification Search
None
See application file for complete search history.

(56) References Cited

U.S. PATENT DOCUMENTS

| | | | | |
|---|---|---|---|---|
| 5,193,212 | A * | 3/1993 | Son | H04M 19/08 340/7.36 |
| 9,590,444 | B2 * | 3/2017 | Walley | H02J 50/80 |
| 9,985,461 | B2 * | 5/2018 | Chen | H02J 50/20 |
| 2005/0186994 | A1 * | 8/2005 | Rahmel | H02J 50/70 455/572 |
| 2006/0281435 | A1 * | 12/2006 | Shearer | G06K 19/0707 455/343.1 |
| 2009/0058361 | A1 * | 3/2009 | John | H02J 50/80 320/128 |
| 2017/0126021 | A1 * | 5/2017 | Desrosiers | H02J 5/005 |

(Continued)

*Primary Examiner* — Leigh M Garbowski
(74) *Attorney, Agent, or Firm* — Li & Cai Intellectual Property (USA) Office (57) ABSTRACT

An electromagnetic wave charge management circuit includes: an antenna to receive an electromagnetic wave signal; a filtering unit electrically connected to the antenna to filter the electromagnetic wave signal received by the antenna; a converting unit electrically connected to the filtering unit to convert the filtered electromagnetic wave signal by the filtering unit into a direct current voltage; a charging unit electrically connected to the converting unit to provide the direct current voltage generated by the converting unit to an internal power supplier of the receiver device; and a controlling unit electrically connected to the filtering unit and the charging unit to transmit a first control signal that is for controlling the filtering unit to filter the electromagnetic wave signal, and a second control signal that is for controlling the charging unit to provide the direct current voltage generated by the converting unit to the internal power supplier.

17 Claims, 5 Drawing Sheets

(56) References Cited

U.S. PATENT DOCUMENTS

2018/0109131 A1\* 4/2018 Nemoto ................. H02J 50/00
2019/0341816 A1\* 11/2019 Aikawa ............... H04B 5/0037
2019/0363746 A1\* 11/2019 Zalewski ............... H04W 4/70

\* cited by examiner

ELECTROMAGNETIC WAVE CHARGE MANAGEMENT CIRCUIT AND ELECTROMAGNETIC WAVE CHARGE MANAGEMENT METHOD

CROSS-REFERENCE TO RELATED PATENT APPLICATION

This application claims priority from the U.S. Provisional Patent Application Ser. No. 62/684,621 filed Jun. 13, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a charge management circuit and a charge management method, and in particular, to an electromagnetic wave charge management circuit and an electromagnetic wave charge management method.

BACKGROUND OF THE DISCLOSURE

In current wireless charging technology, a power supply apparatus (for example a charger) transfers energy to an electrical device (for example, a mobile device) by means of near-field induction, that is, inductive coupling. An operating principle of a wireless charger is according to Faraday's law of induction, that when a current passes through a coil to produce a new magnetic field, variations of the new magnetic field results in an induced current which can be used for charging. The wireless charger uses a primary coil and a secondary coil to induce a current, thereby transferring energy from a transmitter to a receiver.

However, in the current wireless charging technology, an electromotive force can be induced only when the distance of the transmitter (the power supply apparatus) and the receiver (the electrical device) are very close or even attached to each other, causing inconvenience in use. In addition, the wireless charging manner is unable to handle a charging operation with an excessively high load for safety reasons. That is, safe power supply must be ensured if many devices are to be simultaneously charged on a charging panel, otherwise the devices may combust or may cause other dangers. Moreover, electromagnetic induction during wireless charging may interfere with other wireless devices.

Naturally, wireless charging manners also include electromagnetic resonance, which efficiently transfers the energy according to resonance at the same frequency at the transmit end and the receive end. Alternatively, laser light or luminous energy transmitted by solar energy can also be used for charging. However, none of the foregoing methods have been popularized, and still many technical difficulties need to be overcome.

SUMMARY OF THE DISCLOSURE

In response to the above-referenced technical inadequacies, the present disclosure discloses an electromagnetic wave charge management circuit adapted for a receiver device. The electromagnetic wave charge management circuit includes an antenna to receive an electromagnetic wave signal; a filtering unit connected electrically to the antenna to filter the electromagnetic wave signal received by the antenna; a converting unit connected electrically to the filtering unit to convert the filtered electromagnetic wave signal by the filtering unit into a direct current voltage; a charging unit connected electrically to the converting unit to provide the direct current voltage generated by the converting unit to an internal power supplier of the receiver device; and a controlling unit connected electrically to the filtering unit and the charging unit to transmit a first control signal controlling the filtering unit to filter the electromagnetic wave signal, and a second control signal controlling the charging unit to provide the direct current voltage generated by the converting unit to the internal power supplier.

The present disclosure further provides an electromagnetic wave charge management method adapted for wireless charging to a receiver device. The electromagnetic wave charge management method includes the steps of: receiving, by an antenna, an electromagnetic wave signal; transmitting, by a controlling unit, a first control signal and a second control signal; receiving, by a filtering unit, the first control signal from the controlling unit, wherein the filtering unit filters the electromagnetic wave signal received by the antenna based on the first control signal; converting, by a converting unit, the filtered electromagnetic wave signal by the filtering unit into a direct current voltage; receiving, by a charging unit, the direct current voltage from the converting unit, and the second control signal from the controlling unit; and providing, by the charging unit, the direct current voltage to an internal power supplier of the receiver device based on the second control signal.

The present disclosure further provides an electromagnetic wave charge management circuit, adapted for a receiver device that includes a battery module and an internal power supplier. The electromagnetic wave charge management circuit includes: an antenna to receive an electromagnetic wave signal; an adjustable filtering unit that is connected electrically to the antenna so as to filter the electromagnetic wave signal received by the antenna; a radio frequency/direct current (RF/DC) converting unit electrically connected to the filtering unit so as to convert the filtered electromagnetic wave signal filtered by the filtering unit into a direct current voltage by the filtering unit; a voltage regulator unit that is electrically connected to the RF/DC converting unit and that receives the direct current voltage to output a first charging voltage; a selection unit electrically connected to the voltage regulator unit and a connector of the receiver device, so as to receive the first charging voltage from the voltage regulator unit and a second charging voltage from the connector; and a controlling unit electrically connected to the selection unit so as to control the selection unit to output one of the first charging voltage and the second charging voltage to the internal power supplier. The internal power supplier charges the battery module with one of the first charging voltage and the second charging voltage.

In conclusion, the microwave charge management circuit and method of the present disclosure can directly receive the radio wave signal in the air and convert the radio wave signal into a rechargeable DC voltage as a charging power source of the battery module, thereby achieving the technical effect of wireless charging. The present disclosure can trickle charge the battery in the electronic device, thereby prolonging the use time of the electronic device, and a desired microwave frequency band can be selected for selective charging to achieve higher charging efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure provides an electromagnetic wave charge management circuit and an electromagnetic wave charge management method conducting wireless charging via a micro-electrometric wave in the air. Thus, the inconvenience of the prior art can be significantly improved.

Figure 1:
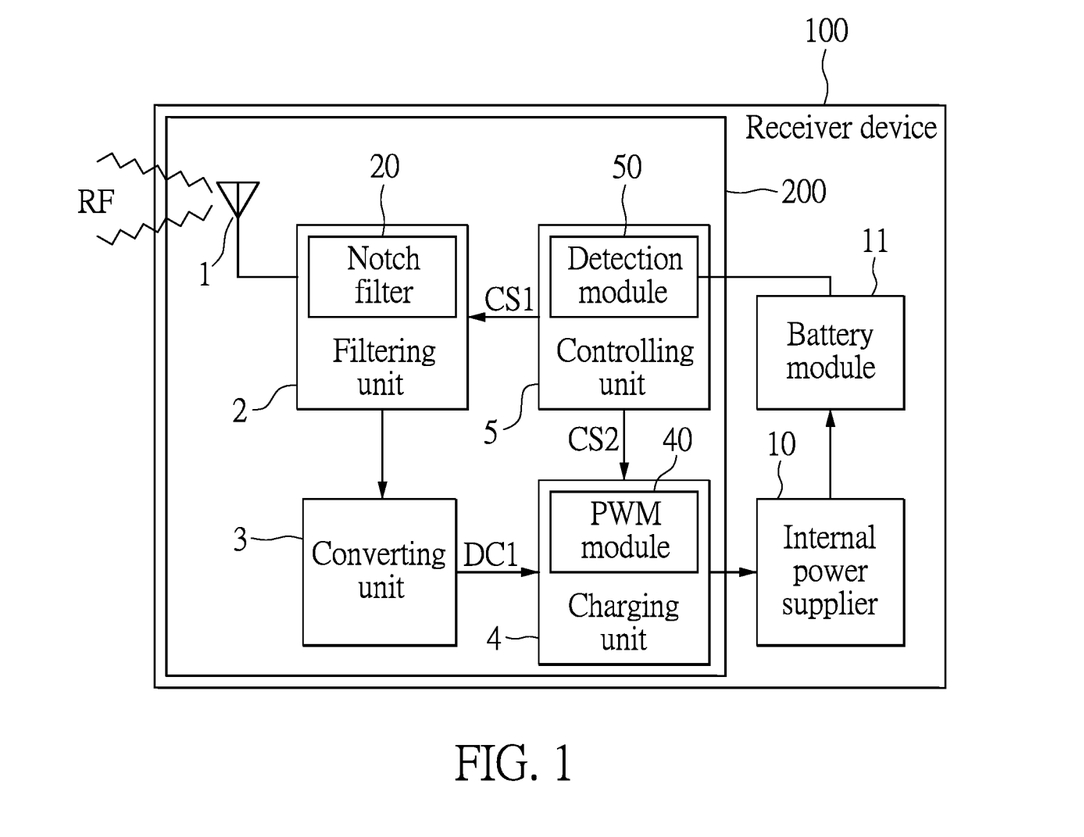
FIG. 1 is a block diagram of basic elements of an electromagnetic wave charge management circuit according to an embodiment of the present application.

Referring to FIG. 1, the electromagnetic wave charge management circuit 200 of the present application is adapted for a receiver device 100 (e.g., a mobile device), and specifically, the electromagnetic wave charge management circuit 200 is configured to be in a hardware form within the receiver device 100. The electromagnetic wave charge management circuit 200 is used to charge an internal battery module 10 of the receiver device 100. The internal battery module 10 is connected to a battery module 11. The receiver device 100 may be a portable consumer electronics product such as a mobile phone, a tablet computer, or a notebook computer; or may also be a device that can be charged via a micro-electrometric wave, such as a wireless communication product, a GPS-related product, a Radio Frequency Identification (RFID) system, a special medical supply, a security-related product and emergency care product, a long-term nursing product, an emergency or backup power system, or a micro-electrometric wave charging system for medium and large power equipment; or may generally refer to a manufacturer with demand for micro-electrometric wave charging of the present disclosure. Therefore, the embodiments of the present disclosure are described by using a mobile phone as an example, but are not limited thereto. It should be noted that, in other embodiments of the present disclosure, the electromagnetic wave charge management circuit 200 can also be independently designed to be externally connected to the receiver device 100, and to authorize or develop an external hardware (such as an external wireless charging disk) after negotiation with the hardware device manufacturer. The present disclosure does not impose any limitation on the position where the electromagnetic wave charge management circuit 200 is disposed.

The electromagnetic wave charge management circuit includes an antenna 1, a filtering unit 2, a converting unit 3, a charging unit 4 and a controlling unit 5. The filtering unit 2 is electrically connected to the antenna and the converting unit 3 so as to filter the electromagnetic wave signal (RF) received by the antenna 1. The converting unit 3 is to convert the filtered electromagnetic wave signal (RF) by the filtering unit 2 into a direct current voltage (DC1). The charging unit 4 is electrically connected to the converting unit 3, and is to regulate and provide the direct current voltage (DC1) generated by the converting unit 3 to an internal power supplier 10 of the receiver device 100. The internal power supplier 10 is electrically connected to the charging unit 4 and the battery module 11 so as to charge the battery module 11 with the direct current voltage (DC1) provided by the charging unit 4.

The antenna 1 can be configured inside the electromagnetic wave charge management circuit 200 to receive electromagnetic wave signal (e.g., radio frequency signal) from the air and transmit the electromagnetic wave signal (RF) to the filtering unit 2. The antenna 1 can be classified in various types. Specifically, the antenna 1 can be a printed antenna, a rectangular microstrip (Patch) antenna, or a flexible (soft) antenna, and the structure of the antenna 1 can be fixed or folded. The antenna 1 can be configured to either the internal or external of the receiver device 100. FIGS. 5A to 5D are schematic views of embodiments of the antenna according to the present application for illustrating that the structure and size of the antenna 1 can be designed in different ways as required. Therefore, the antenna 1 of the present application should not be limited to FIGS. 5A to 5D. The electromagnetic wave signal (RF) includes radio wave, Wi-Fi signal, base station, and microwave. It is noted that the electromagnetic wave charge management circuit 200 in other embodiment of the present application can also use a built-in antenna of the receiver device 100 to receive electromagnetic wave signal (e.g., radio frequency signal) from the air. The embodiment of the built-in antenna of the receiver device 100 will be further demonstrated later.

According to at least one of a user request, an authorization status of charging of the receiver device 100, and performance (capability) of the receiver device 100, the controlling unit 5 of the electromagnetic wave charge management circuit 200 transmits a first control signal (CS1) to the filtering unit 2 and a second control signal (CS2) to the charging unit 4. The first control signal (CS1) can be a frequency band regulation signal. For example, the user demand may be a demand for charging when the user wishes to perform charging, or the user may instruct the frequency band emitted by the receiving device 100 to make adjustments according to the restricted frequency band of the region (e.g., the licensed frequency band of each country). The charging authorization status is a level at which the user or the user device is authorized to charge, for example, whether or not the receiving device 100 is charging in a specific area, whether or not the user or the user device is authenticated as a member, whether or not the user or the user device has made a payment, made a pre-payment or not, and whether or not the charge balance or push notifications from cooperative manufacturers have been watched by the user. There are a lot of authorization manners and levels of charging, and details thereof are not described herein.

The filtering unit 2 of the electromagnetic wave charge management circuit 200 of the present application filters the electromagnetic wave signal (RF) based on the first control signal (CS1) transmitted by the controlling unit 5 so as to obtain the electromagnetic wave signal (RF) with the predetermined frequency band. For example, the filtering unit 2 is a bandpass filter that is used to capture the electromagnetic wave signal (RF) with the frequency bands of 2.4 GHz, 1.8 GHz, or 900 MHz. The function of the filtering unit 2 includes at least noise filtering or unwanted frequency band filtering. Specifically, the filtering unit 2 allows frequencies that are within certain range to pass and rejects frequencies that are outside of the range. The function of noise filtering includes reducing the noise that is generated by the device and that may influence the noise of other device to be lower than the required standard of regulations (e.g., FFC part 15), for example, the noise generated by switching on or off the power. The function of noise filtering also includes reducing the noise entering the device to an extent that it will not cause abnormal operation of a device such as the transmission equipment used in the radio station.

Moreover, the filtering unit 2 in other embodiments of the present application can also include a notch filter 20 that attenuates the electromagnetic wave signal (RF) with a predetermined range of frequency band based on the first control signal (CS1). Specifically, the notch filter 20 can be a resonant circuit or a sensor provided with a switch. In the field of antenna engineering, the notch filter 20 is able to adjust an effective area of the antenna 1 based on the first control signal (CS1), thereby achieving the effect of receiving the electromagnetic wave signal (RF) that is adjustable within a predetermined range of frequency band.

It should be noted that the notch filter 20 can also be used to reject the electromagnetic wave signal (RF) with the predetermined range of frequency band, or can be used cooperatively with the filtering unit 2. For example, the notch filter 20 can be added to the edge of the frequency band of the bandpass filter. Generally, this is implemented by parallel connection with a series resonant or by series connection with a parallel resonant, in which the resonant frequency is the frequency to be filtered. In conclusion, based on the first control signal (CS1), the filtering unit 2 of the electromagnetic wave charge management circuit 200 of the present application filters noise out, attenuates any unwanted frequency band, allows the electromagnetic wave signal (RF) with the predetermined frequency band to pass, and transmits said electromagnetic wave signal (RF) to the converting unit 3.

The converting unit 3 of the electromagnetic wave charge management circuit 200 is to convert the electromagnetic wave signal (RF) received from the filtering unit 2 into a direct current voltage (DC1) and to transmit the direct current voltage (DC1) to the charging unit 4. The converting unit 3 in this embodiment is a radio frequency/direct current (RF/DC) converting unit, but could also be any combination of a plurality of the converting units in other embodiment of the present application. The type of the converting unit 3 should not be limited to the RF/DC converting unit.

The charging unit 4 of the electromagnetic wave charge management circuit 200 is to receive the second control signal (CS2) from the controlling unit 5, and to provide the direct current voltage (DC1) received from the converting unit 3 to the internal power supplier 10 of the receiver device 100 based on the second control signal (CS2), so as to charge the battery module 11. The second control signal (CS2) is to indicate a magnitude of a charging current that the charging unit 4 should charge the internal power supplier 10. Specifically, the second control signal (CS2) can be adjusted according to a current battery power level of the battery module 11, and of course, the second control signal (CS2) can also be adjusted according to user preference, performance (capability) of the receiver device 100, loading status of the internal power supplier 10, or an authorization status of charging of the receiver device 100. It should be noted that since the electromagnetic wave charge management circuit 200 of the present application uses the electromagnetic wave to perform charging, the charging current is small and thus the charging can be regarded as trickle charging. By virtue of the trickle charging, an impact on the battery 11 caused by the charging is reduced. Furthermore, compared with the conventional wireless charging techniques, the wireless charging manner is unable to handle a charging operation with an excessively high load for safety reasons; a safe power supply is ensured since the trickle charging of the present application provides smaller and more stable charging current.

The charging unit 4 may include a buck-boost circuit (not shown) and a pulse width modulation (PWM) module 40. The PWM module 40 controls the magnitude of the charging current provided to the internal power supplier 10 based on the second control signal (CS2). Specifically, the PWM module 40 controls the magnitude of the charging current and value of the charging voltage by adjusting a duty cycle of an internal control signal of the buck-boost circuit. Detailed descriptions on the buck-boost circuit, the PWM module 40 and the method of adjusting the duty cycle of the internal control signal are omitted for sake of brevity.

Figure 2:
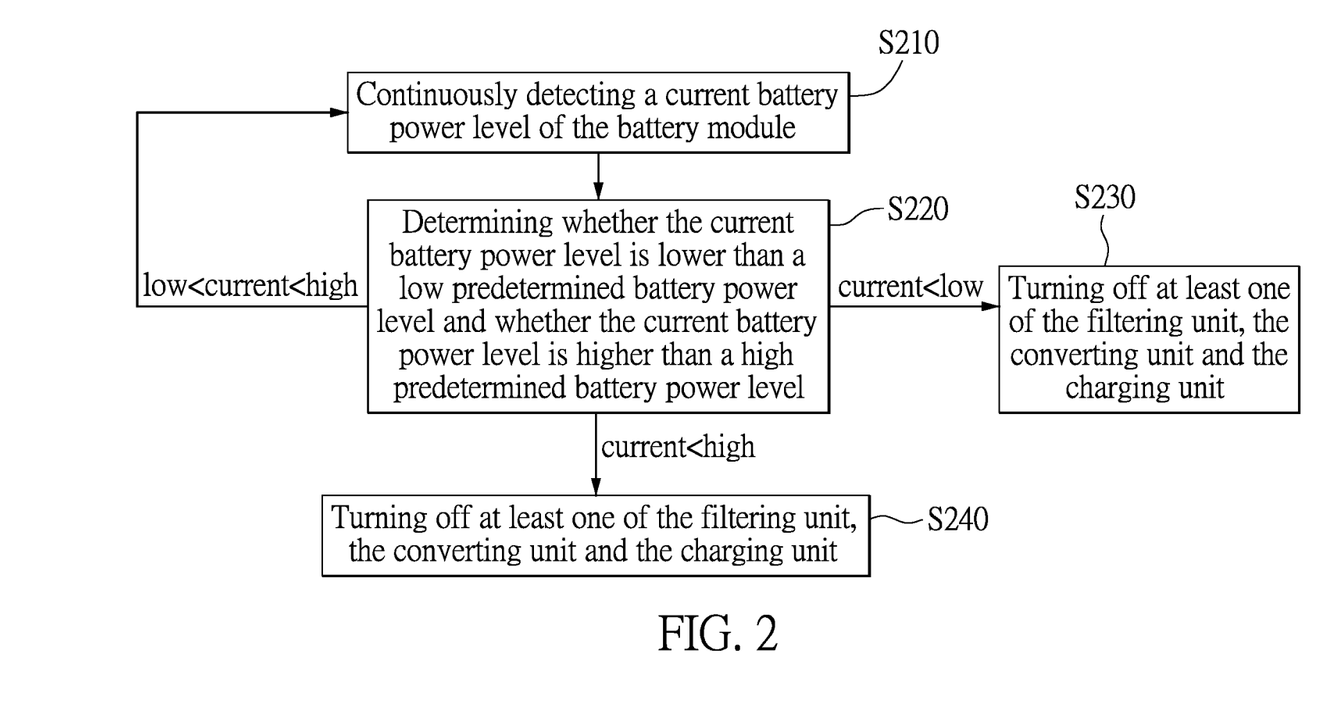
FIG. 2 is a flowchart of detecting a current battery power level according to an embodiment of the electromagnetic wave charge management circuit of the present application.

In other embodiments of the present disclosure, the controlling unit 5 of the electromagnetic wave charge management circuit 200 further includes a detection module 50 that is for continuously detecting a current battery power level of the battery module 11 of the receiver device 100 and determining whether the current battery power level is lower than a low predetermined battery power level (as shown in Steps S210 and S220). Referring to FIG. 2, if the current battery power level is determined to be lower than the low predetermined battery power level (such as 10%), which means the battery power is low and the power consumption needs to be reduced, the control unit 5 turns off the plurality of the module functions of the receiver device 100 (as shown in Step S230). The module functions are, for example, other applications, background programs with lower importance, idle software, and etc. Therefore, unnecessary power consumption is reduced and power saving is achieved. Naturally, the controlling unit 5 of the receiver device 100 can also achieve the effect of power saving by reducing the screen brightness or by putting the receiver device 100 into a sleeping mode. The present application may not be limited to the means to achieve the power saving.

In addition, referring to FIG. 2, the controlling unit 5 can further determine whether the current battery power level detected by the detection module 50 is higher than a high predetermined battery power level (as shown in Steps S210 and S220). If the current battery power level is determined to be higher than the high predetermined battery power level (such as 99%), which means the battery power is sufficient and power charging is not needed at the time, the controlling unit 5 turns off at least one of the filtering unit 2, the converting unit 3 and the charging unit 4 (as shown in Step S240).

Figure 3:
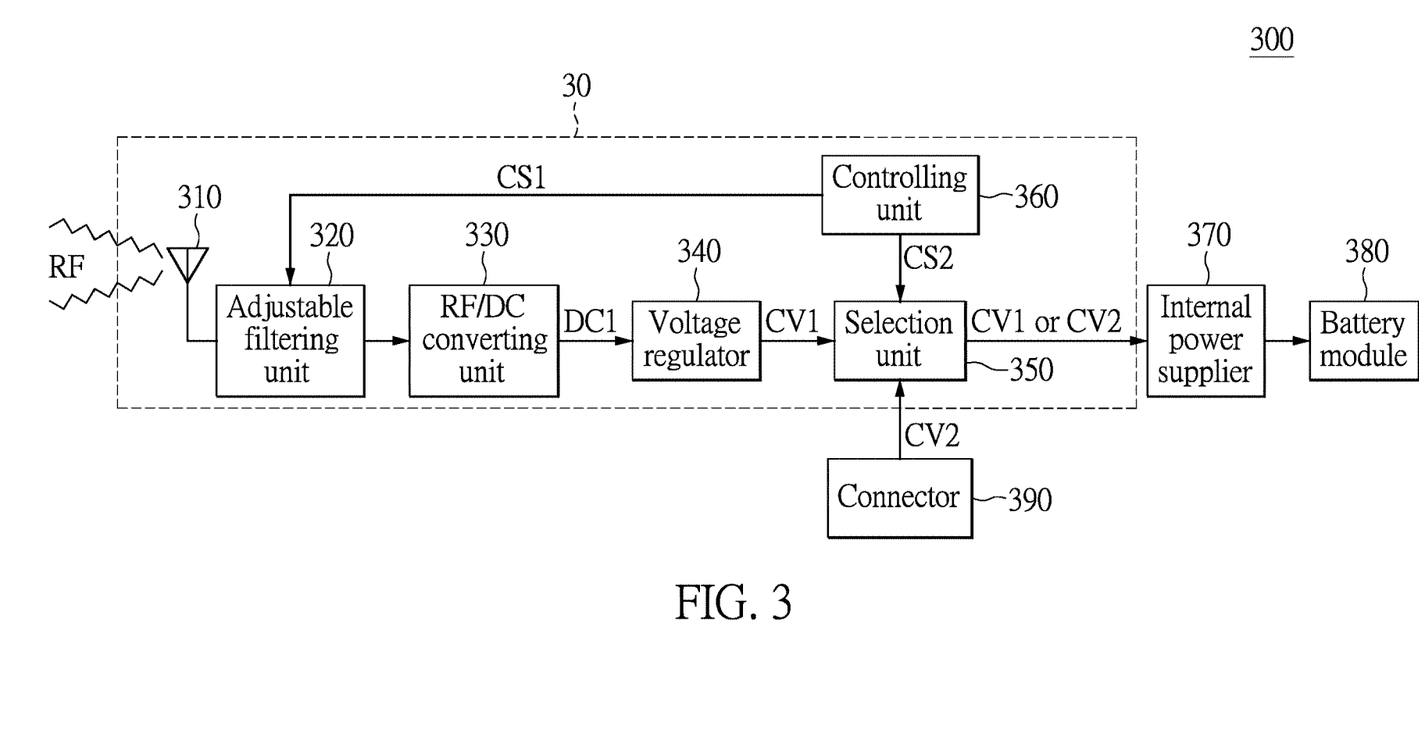
FIG. 3 is a block diagram of basic elements of the electromagnetic wave charge management circuit according to another embodiment of the present application.

Referring to FIG. 3, another embodiment of the electromagnetic wave charge management circuit 200 according to the present application is shown. The receiver device 300 is a mobile device that includes an internal power supplier 370, a battery module 380, a connector 390 and an electromagnetic wave charge management circuit 30. The electromagnetic wave charge management circuit 30 includes an antenna 310, an adjustable filtering unit 320, a radio frequency/direct current (RF/DC) converting unit 330, a voltage regulator 340, a selection unit 350 and a controlling unit 360. The adjustable filtering unit 320 is electrically connected to the antenna 310 and the RF/DC converting unit 330. The voltage regulator 340 is electrically connected to the RF/DC converting unit 330 and the selection unit 350. The controlling unit 360 is electrically connected to the selection unit 350 and the adjustable filtering unit 320. The internal power supplier 370 is electrically connected to the selection unit 350 and the battery module 380.

The antenna 310 is used to receive an electromagnetic wave signal from the air, such as microwave. The adjustable filtering unit 320 is used to filter the electromagnetic wave signal (RF) received by the antenna 310 so as to obtain the electromagnetic wave signal (RF) with a predetermined range of frequency band. The RF/DC converting unit 330 is used to convert the filtered electromagnetic wave signal (RF) by the adjustable filtering unit 320 into a direct current voltage (DC1). The voltage regulator 340 receives and regulates the direct current voltage (DC1) so as to output a first charging voltage (CV1) to the selection unit 350. The first charging voltage (CV1) is for charging the internal power supplier 370. The selection unit 350 is able to receive the first charging voltage (CV1) from the voltage regulator 340 and the second charging voltage (CV2) from the connector 390 of the receiver device 300. The selection unit 350 outputs one of the first charging voltage (CV1) and the second charging voltage (CV2) to the internal supplier 370 based on the second control signal (CS2) received from the controlling unit 360. The connector 390 is, for example, a universal serial bus (USB) connector that is able to receive the second charging voltage (CV2) from an external USB charger (not shown), such as a 5V direct current voltage. The controlling unit 360 controls the selection unit 350 to output one of the first charging voltage (CV1) and the second charging voltage (CV2) to the internal power supplier 370. The internal power supplier 370 charges the battery module 380 with one of the first charging voltage (CV1) and the second charging voltage (CV2).

In other words, the receiver device 300 can charge the battery module 380 with one of the first charging voltage (CV1) provided by the electromagnetic wave charge management circuit 30 and the second charging voltage (CV2) provided by the connector 390, selectively. When the receiver device 300 is not connected to the external USB charger, the receiver device 300 captures the electromagnetic wave signal from the air via the electromagnetic wave charge management circuit 30, and charges the battery module 380 with the first charging voltage (CV1) provided by the electromagnetic wave charge management circuit 30. The energy (electrical power) generated by the electromagnetic wave charge management circuit 30 is correspondingly varied with the strength of the electromagnetic wave signal (RF) received from the air. Therefore, the voltage regulator 340 adjusts (by regulating) the direct current voltage (DC1) so as to achieve the effect of stable charging. When the receiver device 300 outputs a lower voltage, the internal supplier 370 provides the trickle charging to the receiver device 300, thereby extending the time that the charging voltage is provided.

The controlling unit 360 is to automatically detect whether the second charging voltage (CV2) is received by the selection unit 350, and to control the selection unit 350 to switch the output voltage between the first charging voltage (CV1) and the second charging voltage (CV2). Specifically, if the selection unit 350 receives the second charging voltage (CV2) from the connector 390, the selection unit 350 is switched to provide the second charging voltage (CV2) to the internal supplier 370. On the other hand, if the selection unit 350 does not receive the second charging voltage (CV2), the selection unit 350 is switched to receive the first charging voltage (CV1) from the voltage regulator 340 and transmits the first charging voltage (CV1) to the internal supplier 370. By virtue of the switching between the first charging voltage (CV1) and the second charging voltage (CV2), the receiver device 300 can be continuously charged, and the time that the receiver device 300 is used can be extended.

The RF/DC converting unit 330 may implement one of an input matching circuit, a rectifier circuit, and a voltage amplifier to achieve the effect of harvesting energy (electrical power) of the radio frequency. The voltage regulator 340 may implement the voltage stabilizing circuit to stabilize the direct current voltage outputted by the RF/DC converting unit 330. The selection unit 350 may implement a 2-to-1 analog multiplexer, an analog circuit or a switch unit, to achieve path selection. The adjustable filtering unit 320 may be a digital filter or a filtering circuit. The controlling unit 360 outputs the first control signal (CS1) to the adjustable filtering unit 320 to adjust frequency band of the adjustable filtering unit 320 so as to obtain the electromagnetic wave signal (RF) with desired frequency band. The controlling unit 360 outputs the second control signal (CS2) to the selection unit 350 to control the path selection (i.e., switching) of the selection unit 350. The selection unit 350 provides one of the first charging voltage (CV1) and the second charging voltage (CV2) to the internal power supplier 370 based on the second control signal (CS2).

Figure 4:
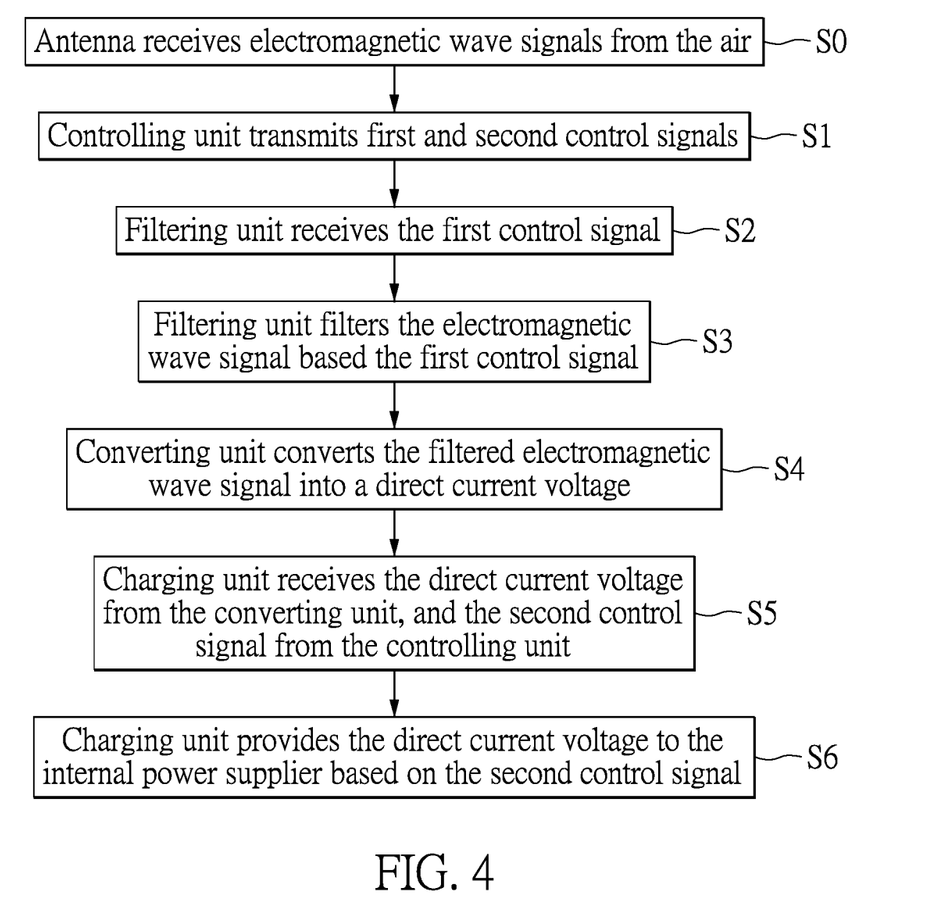
FIG. 4 is a flowchart of an electromagnetic wave charge management method according to the present application.
Figure 5A:
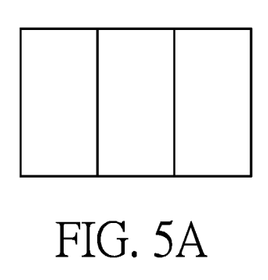
FIGS. 5A to 5D are schematic views of embodiments of the antenna according to the present application.
Figure 5B:
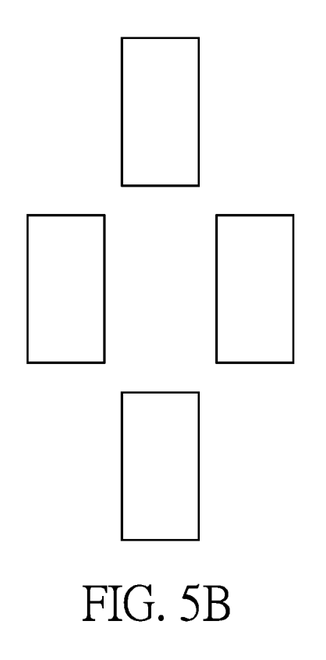
Figure 5C:
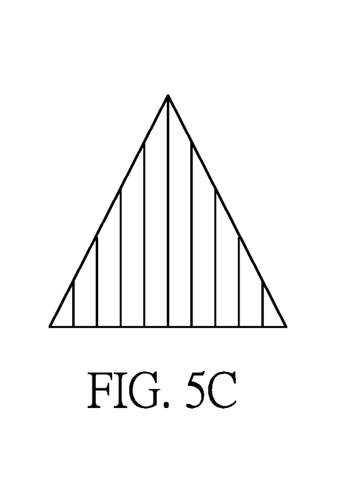
Figure 5D:
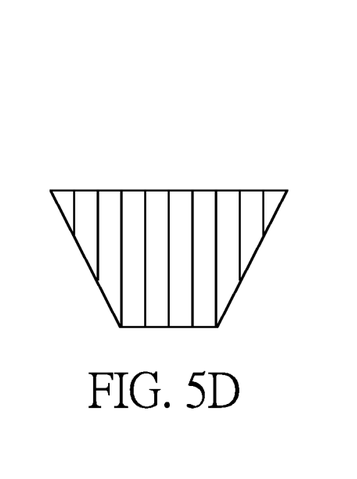

Referring to FIG. 4 and FIG. 1, an electromagnetic wave charge management method according to the present application includes the following steps of:

Step S0: receiving the electromagnetic wave signal (RF) by the antenna 1 from the air, and transmitting said signal to the filtering unit 2.

Step S1: transmitting the first control signal (CS1) and the second control signal (CS2) by the controlling unit 5. Specifically, the controlling unit 5 transmits the first control signal (CS1) and the second control signal (CS2) based on at least one of a user request, an authorization status of charging of the receiver device 100, and performance (capability) of the receiver device 100. Detailed descriptions of the user request and the authorization status of charging have been previously disclosed and will thus be omitted herein for sake of brevity.

Step S2: receiving, by the filtering unit 2, the first control signal (CS1) from the controlling unit 5. The first control signal (CS1) is a frequency band regulation signal.

Step S3: filtering (by selectively receiving), by the filtering unit 2, the electromagnetic wave signal (RF) received by the antenna 1 based on the first control signal (CS1). Specifically, the filtering unit 2 selectively receives and obtains the electromagnetic wave signal (RF) with the predetermined frequency band based on the frequency band regulation signal transmitted by the controlling unit 5. The predetermined frequency band is excluded from the range of frequency band that is prohibited by the frequency band regulation signal. For example, the filtering unit 2 of the electromagnetic wave charge management circuit 200 of the present application can include the functions of filtering noise out, attenuating any unwanted frequency bands, allowing the electromagnetic wave signal (RF) with the predetermined frequency band to pass, and so on. Detailed descriptions of the noise filtering have been previously disclosed and will thus be omitted herein for sake of brevity. In addition, the filtering unit 2 is able to adjust an effective area of the antenna 1 based on the first control signal (CS1), thereby achieving the effect of receiving the electromagnetic wave signal (RF) that is adjustable within the predetermined range of frequency band.

Step S4: converting, by the converting unit 3, the filtered electromagnetic wave signal (RF) from the filtering unit 2 into a direct current voltage (DC1).

Step S5: receiving, by the charging unit 4, the direct current voltage (DC1) from the converting unit 3, and the second control signal (CS2) from the controlling unit 5. Specifically, the charging unit 4 is to receive the second control signal (CS2) from the controlling unit 5, and to provide the direct current voltage (DC1) received from the converting unit 3 to the internal power supplier 10 of the receiver device 100 based on the second control signal (CS2), so as to charge the battery module 11. The second control signal (CS2) is to indicate a magnitude of a charging current that the charging unit 4 should charge the internal power supplier 10 with. Specifically, the second control signal (CS2) is adjustable based on a current battery power level of the battery module 11.

Step S6: providing, by the charging unit 4, the direct current voltage (DC1) to the internal power supplier 10 of the receiver device 100 based on the second control signal (CS2). Specifically, the charging unit 4 controls a magnitude of the charging current provided to the internal power supplier 10 based on the direct current voltage (DC1) and the second control signal (CS2). To control the magnitude of the charging current, at least one of the following methods can be implemented: changing a cycle time of the pulse of the direct current voltage (DC1), changing a width of the pulse of the direct current voltage (DC1), and changing a duty cycle of the pulse of the direct current voltage (DC1). To be specific, the frequency can be adjusted by changing a cycle time of the pulse, and the voltage can be adjusted by changing the width of the pulse. By appropriate combination of the above-mentioned methods, the frequency and the voltage of the direct current voltage (DC1) can be adjusted and controlled. Ultimately, the charging unit 4 outputs a pulse-width-modulated charging signal to the internal power supplier 10 for charging.

Based on the foregoing embodiments, the electromagnetic wave charge management circuit and the electromagnetic wave charge management method according to the present disclosure receives the electromagnetic wave from the air, filters and converts the electromagnetic wave, detects and controls the charging current, and thereby achieving the sustainable trickle charging.

To sum up, with the electricity management method of remote micro-electrometric wave charging of the present disclosure, a plurality of charging devices can perform long-lasting and uninterrupted charging at the same time, without being close to a power supply device, thus avoiding interference between near-field electromagnetic waves. Moreover, the present disclosure can also monitor and automate the adjustment of the charging performance, and can even control between charging and discharging modes in combination with charging authentication or other modes. Therefore, compared with the conventional charging method, the electricity management method of wireless charging of the present disclosure not only enable a user to obtain electricity more conveniently and instantaneously, but also is more practical in charging and discharging.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electromagnetic wave charge management circuit used for a receiver device, the electromagnetic wave charge management circuit comprising:
   an antenna to receive an electromagnetic wave signal;
   a filtering unit electrically connected to the antenna to filter the electromagnetic wave signal received by the antenna;
   a converting unit electrically connected to the filtering unit to convert the electromagnetic wave signal filtered by the filtering unit into a direct current voltage;
   a charging unit electrically connected to the converting unit to provide the direct current voltage generated by the converting unit to an internal power supplier of the receiver device; and
   a controlling unit electrically connected to the filtering unit and the charging unit to transmit a first control signal that is for controlling the filtering unit to filter the electromagnetic wave signal, and a second control signal that is for controlling the charging unit to provide the direct current voltage generated by the converting unit to the internal power supplier.

2. The electromagnetic wave charge management circuit of claim 1, wherein the filtering unit allows the electromagnetic wave signal with a predetermined range of frequency band to pass based on the first control signal.

3. The electromagnetic wave charge management circuit of claim 1, wherein the filtering unit includes a notch filter that attenuates the electromagnetic wave signal with a predetermined range of frequency band based on the first control signal.

4. The electromagnetic wave charge management circuit of claim 1, wherein the charging unit at least includes a Pulse Width Modulation (PWM) module, and the PWM module controls a magnitude of a charging current provided to the internal power supplier based on the second control signal.

5. The electromagnetic wave charge management circuit of claim 4, wherein the PWM module controls the magnitude of the charging current by adjusting a duty cycle of an internal control signal.

6. The electromagnetic wave charge management circuit of claim 1, wherein:
the receiver device includes a plurality of module functions, and
the controlling unit further includes a detection module that is for continuously detecting a current battery power level of the receiver device and that is for determining whether the current battery power level is lower than a predetermined battery power level, wherein the control unit turns off the plurality of the module functions if the current battery power level is determined to be lower than the predetermined battery power level.

7. The electromagnetic wave charge management circuit of claim 1, wherein the controlling unit further includes a detection module that is for continuously detecting a current battery power level of the receiver device and that is for determining whether the current battery power level is higher than a predetermined battery power level, wherein if the current battery power level is determined to be higher than the predetermined battery power level, the controlling unit turns off at least one of the filtering unit, the converting unit and the charging unit.

8. The electromagnetic wave charge management circuit of claim 1, wherein the electromagnetic wave signal includes radio wave, Wi-Fi signal, base station signal, and microwave.

9. An electromagnetic wave charge management method used for wireless charging to a receiver device, the electromagnetic wave charge management method comprising the steps of:
receiving, by an antenna, an electromagnetic wave signal;
transmitting, by a controlling unit, a first control signal and a second control signal;
receiving, by a filtering unit, the first control signal from the controlling unit, wherein the filtering unit filters the electromagnetic wave signal received by the antenna based on the first control signal;
converting, by a converting unit, the electromagnetic wave signal filtered by the filtering unit into a direct current voltage;
receiving, by a charging unit, the direct current voltage from the converting unit, and the second control signal from the controlling unit; and
providing, by the charging unit, the direct current voltage to an internal power supplier of the receiver device based on the second control signal.

10. The electromagnetic wave charge management method of claim 9, wherein the filtering unit allows the electromagnetic wave signal with a predetermined range of frequency band to pass based on the first control signal.

11. The electromagnetic wave charge management method of claim 9, wherein the filtering unit includes a notch filter that attenuates the electromagnetic wave signal with the predetermined range of frequency band based on the first control signal.

12. The electromagnetic wave charge management method of claim 11, wherein the notch filter attenuates the electromagnetic wave signal with the predetermined range of frequency band by adjusting an effective area of the antenna based on the first control signal.

13. The electromagnetic wave charge management method of claim 9, further comprising:
controlling, by a Pulse Width Modulation (PWM) module of the charging unit, a magnitude of a charging current provided to the internal power supplier based on the second control signal.

14. The electromagnetic wave charge management method of claim 13, wherein the PWM module controls the magnitude of the charging current by adjusting a duty cycle of an internal control signal.

15. The electromagnetic wave charge management method of claim 9, further comprising:
continuously detecting, by a detection module of the controlling unit, a current battery power level of the receiver device; and
determining whether the current battery power level is lower than a predetermined battery power level, wherein the control unit turns off a plurality of the module functions of the receiver device if the current battery power level is determined to be lower than the predetermined battery power level.

16. The electromagnetic wave charge management method of claim 9, further comprising:
continuously detecting, by a detection module of the controlling unit, a current battery power level of the receiver device; and
determining whether the current battery power level is higher than a predetermined battery power level, wherein if the current battery power level is determined to be higher than the predetermined battery power level, the controlling unit turns off at least one of the filtering unit, the converting unit and the charging unit.

17. The electromagnetic wave charge management circuit of claim 9, wherein the electromagnetic wave signal includes radio wave, Wi-Fi signal, base station signal, and microwave.

* * * * *